US012703511B2

(12) United States Patent
Razakarivony

(10) Patent No.: US 12,703,511 B2
(45) Date of Patent: Aug. 11, 2026

(54) SYSTEM AND METHOD FOR MONITORING AN AIRCRAFT ENGINE

(71) Applicant: SAFRAN, Paris (FR)

(72) Inventor: Sébastien Philippe Razakarivony, Moissy-Cramayel (FR)

(73) Assignee: SAFRAN, Paris (FR)

( * ) Notice: Subject to any disclaimer, the term of this patent is extended or adjusted under 35 U.S.C. 154(b) by 304 days.

(21) Appl. No.: 17/605,269

(22) PCT Filed: Apr. 21, 2020

(86) PCT No.: PCT/FR2020/000143
§ 371 (c)(1),
(2) Date: Oct. 21, 2021

(87) PCT Pub. No.: WO2020/217004
PCT Pub. Date: Oct. 29, 2020

(65) Prior Publication Data

US 2022/0242592 A1 Aug. 4, 2022

(30) Foreign Application Priority Data

Apr. 23, 2019 (FR) ...................................... 1904283

(51) Int. Cl.
*B64F 5/60* (2017.01)
*B64C 27/04* (2006.01)
(Continued)

(52) U.S. Cl.
CPC ............... *B64F 5/60* (2017.01); *G01M 15/14* (2013.01); *G07C 5/0808* (2013.01);
(Continued)

(58) Field of Classification Search
CPC ....................... B64C 27/04; B64D 2045/0085; B64D 45/00; B64F 5/40; B64F 5/60;
(Continued)

(56) References Cited

U.S. PATENT DOCUMENTS 8,478,479 B2 * 7/2013 Ghelam ............. G05B 23/0283 702/182
8,600,917 B1 * 12/2013 Schimert ................ G06N 20/00 706/14

(Continued)

FOREIGN PATENT DOCUMENTS

| | | | |
|---|---|---|---|
| EP | 2 549 415 | A1 | 1/2013 |
| FR | 3 003 032 | A1 | 9/2014 |
| FR | 3 035 232 | A1 | 10/2016 |

OTHER PUBLICATIONS

International Search Report mailed on Aug. 19, 2020 in PCT/FR2020/000143 filed on Apr. 21, 2020 (3 pages).

(Continued)

*Primary Examiner* — Christian Chace
*Assistant Examiner* — Nicholas Stryker
(74) *Attorney, Agent, or Firm* — Oblon, McClelland, Maier & Neustadt, L.L.P.

(57) ABSTRACT

A system for monitoring an aircraft engine, including an acquisition module for acquiring current measurements of physical quantities, referred to as input and output physical sizes, relative to the aircraft engine, a module for simulating the physical behavior of the aircraft engine, in order to simulate output physical quantities as a function of the current measurements of input physical sizes, a processor for calculating physical margins, referred to as actual physical margins, between the simulated values of output physical quantities and the corresponding current measurements of output physical quantities, a learning module for predicting margins, the margins being predicted using current measurements of input physical quantities and wherein the processor is configured to calculate surveillance residuals giving an indication of the state of the aircraft engine.

9 Claims, 4 Drawing Sheets

(51) Int. Cl.
*B64D 45/00* (2006.01)
*B64F 5/40* (2017.01)
*G01M 15/14* (2006.01)
*G07C 5/08* (2006.01)

(52) U.S. Cl.
CPC ............ *G07C 5/0841* (2013.01); *B64C 27/04* (2013.01); *B64D 2045/0085* (2013.01); *B64F 5/40* (2017.01)

(58) Field of Classification Search
CPC ..... G01M 15/14; G05B 17/02; G07C 5/0808; G07C 5/0841; G07C 5/008
See application file for complete search history.

(56) References Cited

U.S. PATENT DOCUMENTS 9,582,636 B2 * 2/2017 Foiret ..................... G06F 30/15
10,273,021 B1 * 4/2019 Selwa .................... G07C 5/008
10,474,113 B2 * 11/2019 Ewens .................... H02J 3/381
10,964,130 B1 * 3/2021 Dixit .................. G05B 23/0283
11,347,996 B2 * 5/2022 Allmaras ............... G05B 17/02
2009/0048730 A1 * 2/2009 Akkaram ............... G07C 5/006
701/31.4
2010/0082267 A1 * 4/2010 Schimert ............ G05B 19/4065
702/179
2013/0024179 A1 1/2013 Mazzaro et al.
2014/0278313 A1 * 9/2014 Kolbet ................... G05B 17/02
703/8
2017/0131711 A1 * 5/2017 Thomson ............... G06Q 10/08
2017/0352204 A1 * 12/2017 Huet ...................... B64D 45/00
2018/0165898 A1 * 6/2018 Isom ....................... B64C 27/32
2018/0170575 A1 * 6/2018 Ziarno ................... G07C 5/085
2018/0268288 A1 * 9/2018 Vandike ............... G05B 23/024
2019/0147412 A1 * 5/2019 Chiaramonte ......... G06Q 10/20
705/7.13
2021/0319636 A1 * 10/2021 Bharadwaj ............ G06F 16/955

OTHER PUBLICATIONS

Preliminary French Search Report issued on Jan. 22, 2020 in French Application No. 1904283 filed on Apr. 23, 2019 (1 page).

* cited by examiner

SYSTEM AND METHOD FOR MONITORING AN AIRCRAFT ENGINE

TECHNICAL FIELD

The present invention is concerned with the field of monitoring an aircraft engine. In particular, the invention relates to a monitoring method and system for tracking the state of the engine in order to anticipate maintenance operations.

The term "aircraft engine" refers to all turbine engines fitted to flying aircraft, especially helicopters and aeroplanes.

STATE OF PRIOR ART

Currently, the state of aircraft engines, and in particular helicopter engines, is tracked by calculating margins or indicators during specific manoeuvres referred to as Engine Power Check (EPC). The margins are calculated using a physical model that simulates the thermodynamic behaviour of the engine. More particularly, the model receives as inputs data relating to engine and flight conditions and outputs estimated data from the input data. The variables in the output data are also recorded in real time by sensors so that margins are calculated by subtracting the estimates from the records corresponding to the same variables. These margins are then displayed as a function of the flight dates allowing them to be analysed visually or by statistical techniques in order to detect anomalies and trends in margins.

However, before launching an automatic data analysis procedure, it is required that the pilot first places the aircraft in particular flight conditions in stable phases. This problem is solved by a method described in patent FR3003032 for performing automatic detection of these stable phases. This method consists in detecting the conditions in which the validity restrictions of the thermodynamic model are verified, before calculating the margins.

However, these margins remain valid only on those parts for which the physical model remains valid, and thus suffer from the limitation of the monitoring operating range. Further, due to a small amount of data in the stable phases, it is sometimes necessary for a pilot to perform flights entirely dedicated to the calculation of margins, which represents additional workload and cost.

The object of the present invention is, therefore, to provide a system for monitoring and tracking an aircraft engine that remedies the aforesaid drawbacks, in particular by making the best use of the data measured during flights to determine accurate indicators of the engine's state of health.

DISCLOSURE OF THE INVENTION

The invention relates to a monitoring system adapted to monitor an aircraft engine, said system including:

- an acquisition module configured to acquire, during a flight time of the aircraft, current measurements of physical quantities, referred to as physical input quantities and physical output quantities, relating to said aircraft engine and its environment,
- a module for simulating the physical behaviour of said aircraft engine, configured to simulate values of physical output quantities as a function of said current measurements of physical input quantities,
- a processor configured to calculate physical margins, referred to as actual margins, between said simulated values of physical output quantities and said corresponding current measurements of physical output quantities,
- a learning module configured to predict margins, referred to as predicted margins, from the current measurements of physical input quantities, and in that said processor is further configured to calculate monitoring residuals between said actual margins and said predicted margins, said monitoring residuals giving an indication of the state of the aircraft engine.

This system consists of a hybrid combination (not a simple juxtaposition) between the simulation module and the learning module, thus creating a synergy that allows the physical model to be used outside its normal operating mode, in addition of course to its use in its usual operating mode. This makes it possible to make better use of data in the validity space of the physical model used by the simulation module, but also to obtain information outside this validity space. It will also be noted that the learning module would have needed to take account of a very large number of physical variables if it were used alone. This would have drastically complicated understanding of the learning because the physical laws linking these variables can be non-linear and therefore very sensitive to the initial conditions so that minute differences can lead to very different results, making the prediction very noisy.

Advantageously, said current measurements of physical input quantities and physical output quantities are acquired during the stable and transient phases of said aircraft flight.

By taking the transient or unstable phases into account, many more residual points are obtained and consequently the results are much less noisy, allowing a better trend tracking to be automatically performed and consequently allowing a much faster reaction in case of anomalies. This also makes it possible to monitor unstable or transient phases (for example at take-off and landing). With fewer points, it would have been much more difficult to determine the trend.

Advantageously, the system includes an interaction and/or display interface for viewing graphical representations of said monitoring residuals.

This provides information on trends, anomalies or breaks relating to the aircraft engine.

Advantageously, the learning module is based on a learning model previously constructed by using a reference aircraft engine during a predetermined number of learning flights, the measurements of physical input quantities relating to the reference engine as well as the actual margins generated by the simulation module being injected during each learning flight into the learning module, allowing the latter to construct the learning model.

Thus, by using a reference aircraft engine in the same contexts, the learning module can learn to predict the margins accurately.

Advantageously, said number of learning flights is selected to provide compromise between accuracy and stability of the learning model and only the first elements in the series of flights are taken into account. This increases the learning efficiency while maintaining high accuracy.

It will be noted that it is not the selection of any number of learning flights, but the selection of the first elements in the series of flights. Indeed, if these flights are not among the first flights of the engine use, the relationship to be learned (the physical model/actual system margins) changes too much to be learned. The modelling error would no longer be constant but time-dependent, and thus could no longer be learned.

According to one embodiment, said learning model is constructed according to a statistical technique of linear regression, neural networks, or random forests.

The physical input quantities include at least one input parameter relating to the aircraft engine and/or to the flight conditions of the aircraft, comprising at least one parameter selected from the speed of rotation of the engine, external temperature, external pressure, fuel flow rate, air flow rate taken from the engine, electrical energy drawn from the engine, position of the vanes, flight altitude, absence or presence of filters, and the physical output variables include at least one output parameter representative of the operating state of the aircraft engine, comprising at least one parameter selected from the internal temperature of the engine and the torque of a shaft of the engine.

Advantageously, the monitoring residuals are aggregated as averages or modes for synthetic representation.

According to one embodiment of the present invention, the aircraft engine is a helicopter turbine engine.

The invention also relates to a method for monitoring an aircraft engine, including the following steps of:

- acquiring, during a flight time of the aircraft, current measurements of physical quantities, referred to as physical input quantities and physical output quantities, relating to said aircraft engine and its environment,
- simulating values of physical output quantities as a function of said current measurements of physical input quantities,
- calculating physical margins, referred to as actual margins, between said simulated values of physical output quantities and said corresponding current measurements of physical output quantities,
- predicting margins, referred to as predicted margins, from the current measurements of physical input quantities, and
- calculating monitoring residuals between said actual margins and said predicted margins, said monitoring residuals giving an indication of the state of the aircraft engine.

It will be noted that, according to the present invention, a first (physical) model is used to construct a better (empirical+physical) model.

It will be additionally noted that, in the present invention, the predicted margins are defined at the same time instant as the data used. Further, the term "prediction" is used here in the sense of statistical learning and thus of an output of the empirical model on input data.

It will also be noted that, in the present invention, the monitoring residual is defined between the actual margins and the predicted margins. Thus, the monitoring residuals are distinct from the "margins" usually used by those skilled in the art.

Furthermore, it will be noted that the learning module according to the present invention does not predict the state of the system, but the residual between a physical model and the system. Thus, the present invention relates to the use of two cascade models: the first (physical) model gives margins, and the second (empirical/learning) model predicts the usual deviation between the physical model and the actual system. It will be noted that it is not obvious to use the physical model in zones where it is not valid according to physical theories. However, by construction, the system according to the present application learns to correct these errors.

BRIEF DESCRIPTION OF THE FIGURES

Further characteristics and advantages of the invention will become apparent upon reading a preferential embodiment of the invention, described with reference to the accompanying figures, among which.

DESCRIPTION OF THE EMBODIMENTS

The principle of the invention consists in coupling a physical model of the behaviour of the aircraft engine with a learning model so that usage of the measurements acquired during flights is maximised, thus allowing a complete and optimal tracking of the engine.

Figure 1:
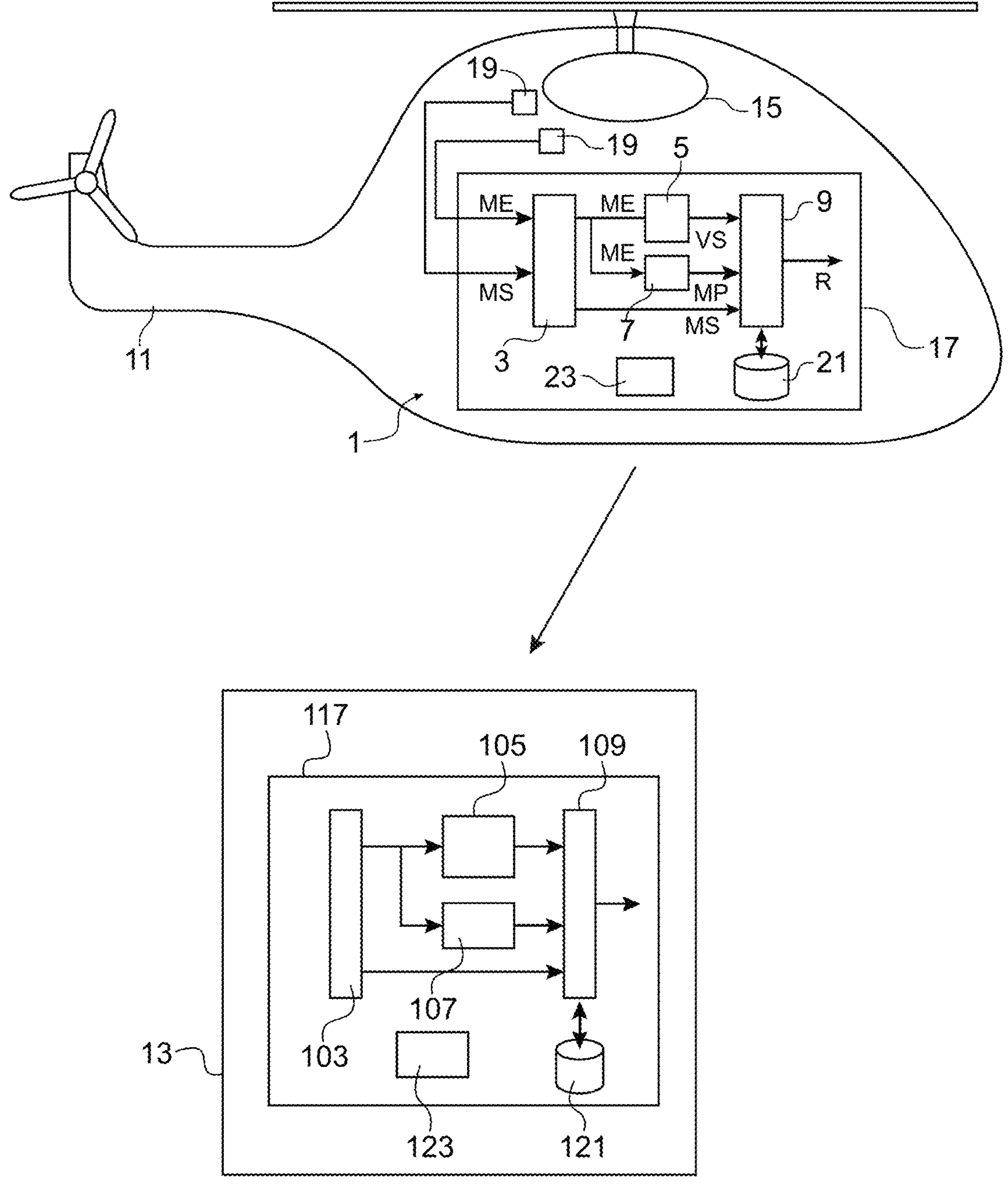
FIG. 1 schematically illustrates a system for monitoring an aircraft engine according to one embodiment of the invention.

FIG. 1 schematically illustrates a system for monitoring an aircraft engine according to one embodiment of the invention.

The monitoring system 1 includes an acquisition module 3, a simulation module 5, a learning module 7 and a processor 9.

The monitoring system 1 may be entirely included in an aircraft 11 or shared between the aircraft 11 and a maintenance centre 13.

The aircraft 11 (here represented by a helicopter but may be an aeroplane) comprises an engine 15, an on-board computer 17 and sensors 19.

The sensors 19 measure physical quantities, referred to as physical input quantities and physical output quantities, relating to the aircraft engine 15 and its environment.

By way of example, the physical input quantities may include at least one input parameter relating to the aircraft engine 15 and/or to the flight conditions of the aircraft 11, comprising at least one parameter selected from the speed of rotation of the engine 15, external temperature, external pressure, fuel flow rate, air flow rate taken from the engine 15, electrical energy drawn from the engine 15, position of the vanes, flight altitude, and absence or presence of filters. The physical output quantities may include at least one output parameter representative of the operating state of the aircraft engine, including at least one parameter selected from the internal temperature of the engine 15 and the torque of a shaft of the engine 15.

The on-board computer 17 comprises the processor 9, the acquisition 3, simulation 5 and learning 7 modules as well as a recording memory 21 and an interface 23. It will be noted that the maintenance centre 13 also includes a computer 117 which may comprise the same elements (i.e. processor 109 and acquisition 103, simulation 105 and learning 107 modules, a memory 121 and an interface 123) as the on-board computer 17.

The memory 21 (and/or 121) forms a recording medium, readable by the processor 9 (and/or 109) and on which is (are) recorded one or more computer program(s) including instruction codes for executing the monitoring method described below with reference to FIG. 2.

Figure 2:
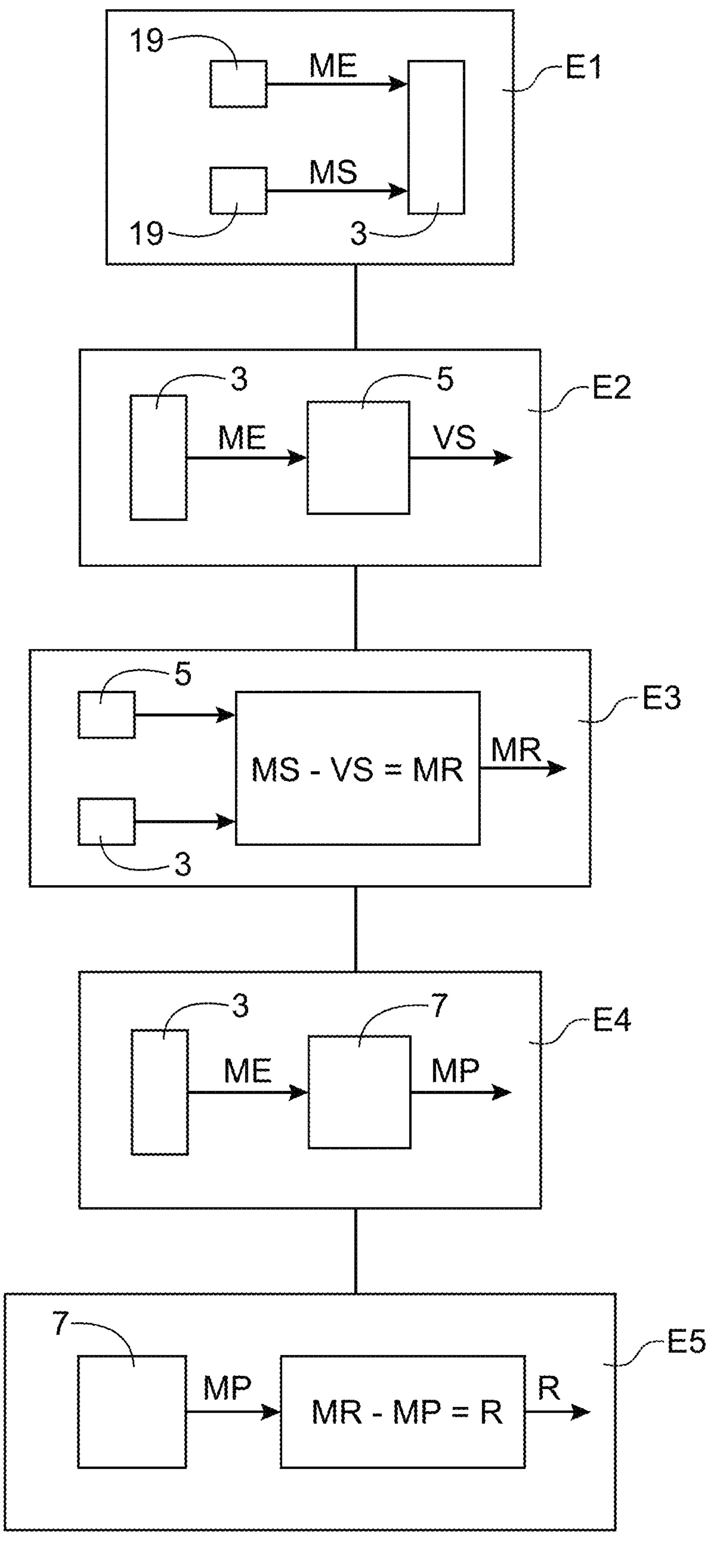
FIG. 2 schematically illustrates a method for monitoring an aircraft engine according to one embodiment of the invention.

Indeed, FIG. 2 schematically illustrates a method for monitoring an aircraft engine according to one embodiment of the invention.

In step E1, the acquisition module 3 (and/or 103) is configured to acquire, during a flight time of the aircraft 11, current measurements of physical input quantities ME and physical output quantities MS.

In step E2, the simulation module 5 (and/or 105) is adapted to simulate the physical behaviour of the aircraft engine 15. Indeed, the simulation module 5 includes a thermodynamic model of the relationships between physical quantities relating to the engine 15 and acts as a solver that calculates output data as a function of the input data. Thus, the simulation module 5 is configured to simulate values of physical output quantities VS as a function of the current measurements of physical input quantities ME retrieved from the acquisition module 3. Thus, the values of physical output quantities VS are simulated from the input values observed in real time.

In step E3, the processor 9 (and/or 109) is configured to calculate physical margins, referred to as actual margins, between the simulated values of physical output quantities VS and the corresponding current measurements of physical output quantities MS. The actual margins represent differences between the actual data of the engine observed in real time and the outputs calculated by the simulation module. In other words, the actual margins define actual errors between the physical model and the observed physical quantities.

Advantageously, the current measurements of physical input quantities ME and physical output quantities MS are acquired by the acquisition module 3 during the stable and transient phases of the flight of the aircraft 11.

Indeed, the physical model has a specific domain of validity, but outside this domain of validity, modelling can be considered as a reasonable approximation of the behaviour of the engine 15 and can be used as a support by the learning module 7. It should be noted, however, that this approximation is not good enough to be used alone.

In step E4, the learning module 7 (and/or 107) is configured to predict margins, referred to as predicted margins MP, from the current measurements of physical input quantities ME (i.e. the observed input values). The learning module 7 includes a statistical learning model based on a known technique of the linear regression, neural networks, or random forests type.

The learning module 7 is based on a statistical learning model previously constructed to learn margins according to conventional techniques of the linear regression or random forests type. This learning phase is described subsequently with reference to FIG. 3.

Thus, a coupling is constructed between the simulation module 5 and the learning module 7, allowing the latter to learn to predict accurate margins on all the phases of the flight from the margins generated by the simulation module 5, by correcting the approximate margins generated by the simulation module 5 in the transient phases. This coupling makes it possible to better make use of the data in the validity space of the physical model used by the simulation module 5 and, in addition, to obtain information outside this validity space.

In step E5, the processor 9 (and/or 109) is further configured to calculate monitoring residuals R between the actual margins and the predicted margins. The monitoring residuals give an indication of the state of the aircraft engine 15. Tracking the monitoring residuals improves the calculated margins and allows accurate results to be obtained outside the validity range of the physical model.

The monitoring residuals R may be represented as scatter plots or graphs for viewing on the interaction and/or display interface 23 (or 123) of the computer 17 (or 117) thereby providing information on trends, anomalies or breaks relating to the aircraft engine. Advantageously, for better readability, the monitoring residuals are aggregated as averages, modes, or any other miniaturisation technique for synthetic representation.

Advantageously, the operational data collected during the flight of the aircraft are downloaded at the end of the flight. The computer 117 in the maintenance centre 13 performs the steps according to FIG. 2 and the results are displayed on the interface 123. Maintenance experts can thus look at the residual curves, in order to alert in case of abnormal behaviour, be it breaks in the curves, abnormal trends, or anomalies.

Figure 3A:
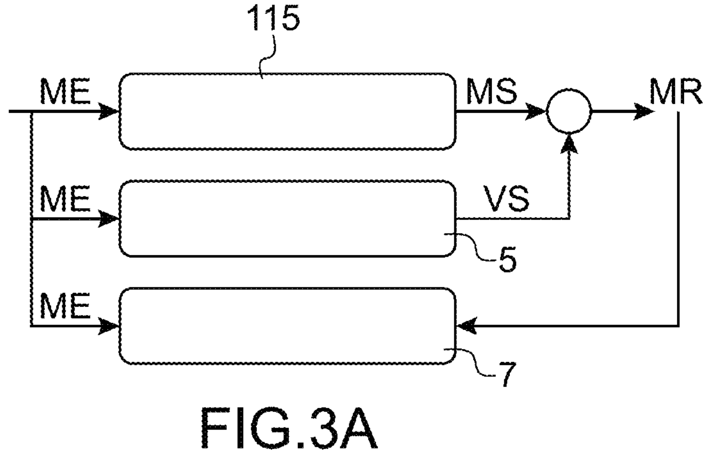
FIG. 3A schematically illustrates the preliminary learning phase of the learning module, according to one embodiment of the invention.
Figure 3B:
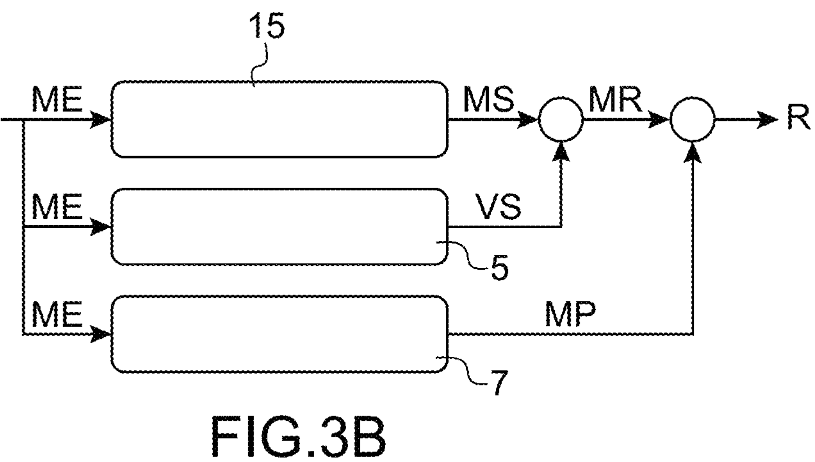
FIG. 3B schematically illustrates the operational phase, according to one embodiment of the invention.

FIGS. 3A and 3B schematically illustrate the preliminary learning phase of the learning module as well as the operational phase, according to one embodiment of the invention.

More particularly, FIG. 3A represents the learning phase during which the learning module constructs a learning model based on a very stable reference aircraft engine 115.

In order to increase the accuracy of learning, it is advantageous to have a reference engine 115 used in the same contexts as the engines to be monitored. It is also advantageous to take the first elements in the series of recorded flights, and not flights randomly selected from the database, as is usually done in statistical learning.

Learning takes place over a time window [t-k; t] defined as relevant from about a few hours to a few tens of flight hours, with a sufficient number of examples taken from the first flights of a predetermined number of learning flights. Indeed the learning model works on the margins and not directly on the output variables. By definition, the margins are small and therefore noisy, which requires a good control of the learning part, in particular the number of examples to be used. The greater the number of examples, the more accurate the learning model. However, if it is too large, the engine will change state and the stability of the model will be lost. Thus, the number of learning flights is selected to provide compromise between accuracy and stability of the learning model and it is therefore advantageous to select a reasonable number of flights. This number depends on the learning technique and can be, for example, between three and ten flights.

Advantageously, the time window encompasses physical input quantities relating to the aircraft engine and the aircraft flight conditions, up to predicting the physical output variable(s), from time step t-k to time step t.

Indeed, since outside the validity zones of the physical model, the input variables relating to the engine and the external conditions are not in a steady state, the learning technique according to the invention takes account of the past over a certain time window in order to further reduce noise. In other words, not only the previous time steps from t-k to t-l are used, but also the values of the variables at time t. It should be noted that in conventional learning methods, only the previous time steps are taken into account according to a predictive logic.

As in the operational phase, the acquisition module of the reference engine 115 collects, during each learning flight, the current measurements of physical input quantities ME and physical output quantities MS relating to the reference engine 115 during the stable and transient phases of the flight.

The physical input quantities ME are injected into the simulation module 5. The latter estimates values of physical output quantities VS as a function of the current measurements of physical input quantities ME.

The processor then calculates differences between the simulated values of physical output variables VS and the corresponding current measurements of physical output quantities MS. These differences produce the actual margins MR.

Then, the measurements of the physical input quantities ME (relating to the reference engine and to the external conditions) over several time steps as well as the actual margins MR generated by the simulation module 5 are injected into the learning module 7 allowing the latter to construct the learning model.

Thus, the learning module 7 learns by means of the physical input quantities affecting the reference engine over several time steps and not only on the instantaneous values, relationships between the actual margins MR and the predicted margins MP (i.e. the difference between the margins generated by the physical model and those generated by the learning model).

Learning according to the invention is thus facilitated by the physical model which absorbs impact of parameterisation data and fills in most of the data. More particularly, the monitoring system performs merging between the physical model and the learning model where the results of the physical model are used by the learning model to predict the margins. Furthermore, learning is based on the data history and uses the entire recorded time series (i.e., stable and unstable).

FIG. 3B illustrates the operational phase, according to the steps described with reference to FIG. 2, which consists in predicting values of the margins obtained and comparing them with the margins actually output by the reference engine.

More particularly, the acquisition module collects, during each operational flight, the current measurements of physical input quantities ME and physical output quantities MS relating to the engine 15 under monitoring during all the stable and transient phases of the flight.

The simulation module 5 then estimates the values of physical output quantities VS as a function of the current measurements of physical input quantities ME. The processor then calculates the actual margins MR by differentiating between the simulated values of physical output quantities VS and the corresponding current measurements of physical output quantities MS.

Then, the learning module 7 determines the predicted margins MP from the current measurements of physical input quantities ME. Finally, the processor calculates the monitoring residuals R between the actual margins MR and the predicted margins MP.

Figure 4:
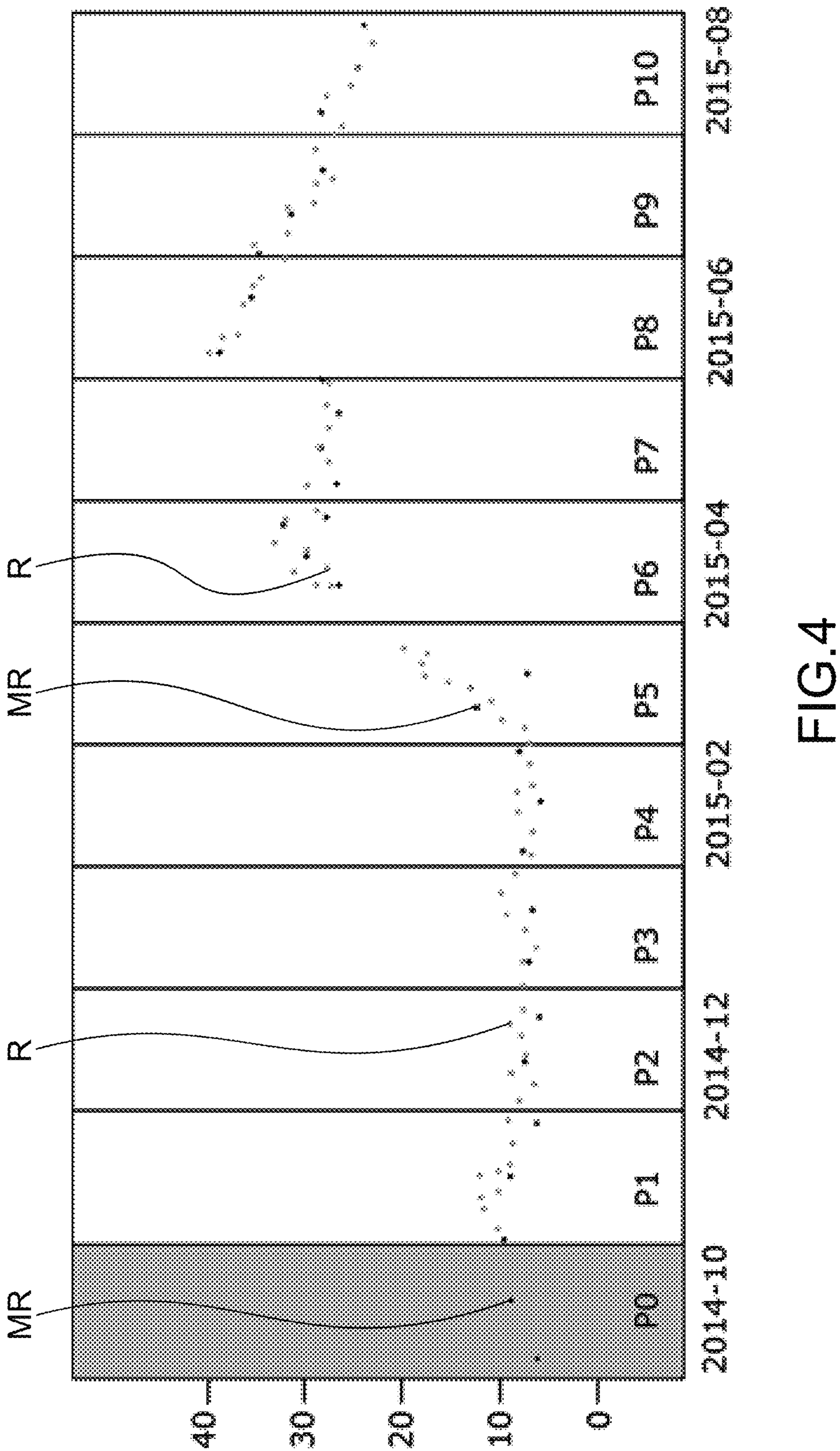
FIG. 4 illustrates a graph representing monitoring margins and residuals, according to one embodiment of the invention.

FIG. 4 illustrates a scatter plot representative of the margins and monitoring residuals, according to one embodiment of the invention.

According to this example, the ordinate axis represents the margins of the internal temperature of the engine 15 (or 115) according to a 10° C. scale and the abscissa axis represents the dates or periods of flights subdivided into quarters.

Each black point represents the average of the actual margins MR per flight and each grey point represents the average of the monitoring residuals R per flight.

Initially, there is a preliminary learning phase (period P0) where there are only black dots (i.e. actual margins). Then, an operational phase (periods P1-P8) starts where the monitoring residuals R (i.e. grey points) are calculated in addition to the actual margins MR. It will be noted that there are many more grey points than black points because the latter are calculated only on stable phases while the grey points are determined on all phases of the flight.

Thus, by taking account of the transient or unstable phases, many more monitoring points are obtained and consequently, the results are much less noisy, allowing a better trend tracking to be automatically performed and consequently allowing a much faster reaction in case of anomalies. This also makes it possible to monitor unstable or transient phases (for example at take-off and landing). With fewer points, it would have been much more difficult to determine the trend.

It will be noted that an engine is considered old when it has no margin left (i.e. when the internal temperature margin according to the diagram in FIG. 4 is close to zero). This diagram also shows that in the period P6, the engine has undergone maintenance which allowed the margin to be increased.

Thus, the monitoring system according to the invention uses the physical model as a first-order approximation, which facilitates learning. Furthermore, it uses the first flights of a reference engine to learn the model rather than taking random flights. In addition, it uses the history of the variables, not only the instantaneous value of the variables, to properly model dynamic parts.

The monitoring method and system according to the invention is adapted for all aircraft engines and in particular, for an aircraft engine that has many transient or unstable phases such as a helicopter.

The invention claimed is:

1. A system for monitoring an aircraft engine, including:

an acquisition module configured to acquire, during a flight time of the aircraft, current measurements of physical quantities, referred to as physical input quantities and physical output quantities, relating to said aircraft engine and its environment, a module for simulating the physical behavior of said aircraft engine, configured to simulate values of physical output quantities as a function of said current measurements of physical input quantities observed in real time, a processor configured to calculate, during a preliminary learning phase in an earliest time period, at each of a plurality of instants of real time, physical margins, referred to as actual margins, between said simulated values of physical output quantities and said corresponding current measurements of physical output quantities observed in real time, a learning module configured to predict, during an operational phase in remaining time periods following the learning phase for a plurality of the instants of real time, margins, referred to as predicted margins, the predicted margins being expected actual margins between the simulated values and the current measurements of physical input quantities based on the actual margins that were already calculated in past time periods that have elapsed, and wherein said processor is further configured to calculate monitoring residuals as a difference, at each instant of time, between (i) said actual margins that are calculated by said processor during the operational phase between said simulated values of physical output quantities and said corresponding current measurements of physical output quantities observed in real time and (ii) said predicted margins that are predicted from the learning module, said monitoring residuals giving an indication of the state of the aircraft engine, such that the monitoring residuals are only calculated during the operational phase and the actual margins are calculated during both the learning phase and the operational phase, wherein the system further comprises a display interface for viewing graphical representations of said monitoring residuals, and the processor is configured to control the display interface to display the graphical representations of said monitoring residuals as a scatterplot graph that includes a plurality of time periods which form (i) the preliminary learning phrase in the earliest time period, where only the actual margins are displayed and (ii) the operational phase in the remaining time periods where the monitoring residuals are displayed in addition to the actual margins.

2. The system according to claim 1, wherein said current measurements of physical input quantities and physical output quantities are acquired during stable and transient phases of said flight of the aircraft.

3. The system according to claim 1, wherein the learning module is based on a learning model previously constructed by using a reference aircraft engine during a predetermined number of learning flights, the measurements of physical input quantities relating to the reference engine as well as the actual margins generated by the simulation module being injected during each learning flight into the learning module enabling the latter to construct the learning model.

4. The system according to claim 3, wherein said number of learning flights is selected to provide compromise between accuracy and stability of the learning model and in that only first elements in the series of flights are taken into account.

5. The system according to claim 3, wherein said learning model is constructed according to a statistical technique of linear regression or random forests.

6. The system according to claim 1, wherein the physical input quantities include at least one input parameter relating to the aircraft engine and/or to the flight conditions of the aircraft, comprising at least one parameter selected from the speed of rotation of the engine, external temperature, external pressure, fuel flow rate, air flow rate taken from the engine, electrical energy drawn from the engine, position of the vanes, flight altitude, absence or presence of filters, and in that the physical output quantities include at least one output parameter representative of the operating state of the aircraft engine, comprising at least one parameter selected from the internal temperature of the engine and the torque of a shaft of the engine.

7. The system according to claim 1, wherein the monitoring residuals are aggregated as averages or modes for synthetic representation.

8. The system according to claim 1, wherein the aircraft engine is a helicopter turbine engine.

9. A method, implemented by a system, for monitoring an aircraft engine, including the following steps of:

acquiring, during a flight time of the aircraft, current measurements of physical quantities, referred to as physical input quantities and physical output quantities, relating to said aircraft engine and its environment, simulating values of physical output quantities as a function of said current measurements of physical input quantities observed in real time, calculating, during a preliminary learning phase in an earliest time period, at each of a plurality of instants of real time, physical margins, referred to as actual margins, between said simulated values of physical output quantities and said corresponding current measurements of physical output quantities observed in real time, predicting, during an operational phase in remaining time periods following the learning phase for a plurality of the instants of real time, margins, referred to as predicted margins, the predicted margins being expected actual margins between the simulated values and the current measurements of physical input quantities based on the actual margins that were already calculated in past time periods that have elapsed, and calculating monitoring residuals as a difference, at each instant of time, between (i) said actual margins that are calculated by said processor during the operational phase between said simulated values of physical output quantities and said corresponding current measurements of physical output quantities observed in real time and (ii) said predicted margins that are predicted from the learning module, said monitoring residuals giving an indication of the state of the aircraft engine, such that the monitoring residuals are only calculated during the operational phase and the actual margins are calculated during both the learning phase and the operational phase, wherein the system further comprises a display interface for viewing graphical representations of said monitoring residuals, and the method further includes controlling the display interface to display the graphical representations of said monitoring residuals as a scatterplot graph that includes a plurality of time periods which form (i) the preliminary learning phrase in the earliest time period, where only the actual margins are displayed and (ii) the operational phase in the remaining time periods where the monitoring residuals are displayed in addition to the actual margins.

* * * * *